US012739832B2

(12) United States Patent
Gao et al.

(10) Patent No.: US 12,739,832 B2
(45) Date of Patent: Sep. 15, 2026

(54) METHOD, DEVICE AND COMPUTER STORAGE MEDIUM FOR COMMUNICATION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 758 days.

(21) Appl. No.: 18/007,354

(22) PCT Filed: Jul. 31, 2020

(86) PCT No.: PCT/CN2020/106423
§ 371 (c)(1),
(2) Date: Jul. 31, 2023

(87) PCT Pub. No.: WO2022/021426
PCT Pub. Date: Feb. 3, 2022

(65) Prior Publication Data
US 2023/0284221 A1 Sep. 7, 2023

(51) Int. Cl.
*H04W 72/20* (2023.01)
*H04B 7/06* (2006.01)
(Continued)

(52) U.S. Cl.
CPC ........ *H04W 72/20* (2023.01); *H04B 7/06952* (2023.05); *H04L 1/1812* (2013.01);
(Continued)

(58) Field of Classification Search
CPC .............. H04W 72/20; H04W 72/1263; H04B 7/06952; H04L 1/1812; H04L 5/0053;
(Continued)

(56) References Cited

U.S. PATENT DOCUMENTS

2019/0274169 A1 9/2019 Tsai et al.
2019/0281587 A1 9/2019 Zhang et al.
(Continued)

FOREIGN PATENT DOCUMENTS

CN 111096029 A 5/2020
WO 2019/199143 A1 10/2019
(Continued)

OTHER PUBLICATIONS

Apple Inc., "Remaining Issues on Multi-beam operation", 3GPP TSG RAN WG1 #100-e, e-Meeting, R1-2000860, Feb. 24-Mar. 6, 2020, pp. 1-12.
(Continued)

*Primary Examiner* — Obaidul Huq
(74) *Attorney, Agent, or Firm* — Sughrue Mion, PLLC

(57) ABSTRACT

Embodiments of the present disclosure relate to methods, devices and computer storage media for communication. According to embodiments of the present disclosure, a first physical downlink control channel (PDCCH) indicating a transmission configuration indication (TCI) state is transmitted from a network device to a terminal device. The terminal device applies, based on a first time threshold, the TCI state for monitoring a second PDCCH transmitted from the network device. The terminal device applies, based on a second time threshold, the TCI state for receiving a physical downlink shared channel (PDSCH) transmitted from the network device. As such, a common beam used for PDCCH and PDSCH, which is indicated by a common TCI state, can be updated and the updated beam can be applied for PDCCH and PDSCH transmission/reception.

8 Claims, 7 Drawing Sheets

(51) Int. Cl.
*H04L 1/1812* (2023.01)
*H04L 5/00* (2006.01)
*H04W 72/1263* (2023.01)

(52) U.S. Cl.
CPC .......... *H04L 5/0053* (2013.01); *H04L 5/0094* (2013.01); *H04W 72/1263* (2013.01)

(58) Field of Classification Search
CPC ... H04L 5/0094; H04L 1/1854; H04L 5/0055; H04L 5/0044; H04L 5/001; H04L 5/0048; H04L 5/0051
USPC .......................................... 370/310, 328, 329
See application file for complete search history.

(56) References Cited

U.S. PATENT DOCUMENTS

2019/0297640 A1 9/2019 Liou et al.
2021/0321406 A1* 10/2021 Sakhnini ............... H04W 80/02
2021/0321442 A1* 10/2021 Jung ..................... H04L 5/0053

FOREIGN PATENT DOCUMENTS

WO 2020/012662 A1 1/2020
WO 2020/054036 A1 3/2020

OTHER PUBLICATIONS

Communication issued Feb. 4, 2025 in Japanese Application No. 2023-506345.
Nokia et al., "FL summary cross-carrier scheduling with different numerology", 3GPP TSG RAN WG1 #100 R1-2001068, e-meeting, Feb. 18-Mar. 6, 2020, 17 pages.
International Search Report for PCT/CN2020/106423, dated Apr. 27, 2021.
Written Opinion for PCT/CN2020/106423, dated Apr. 27, 2021.
"Remaining Issues on Beam Management", Intel Corporation,3GPP TSG RAN WG1 #94 R1-1808669, Sweden, Aug. 20-24, 2018 (17 pages).
Japanese Office Action dated Jun. 25, 2024 in Application No. 2023-506345.

* cited by examiner

METHOD, DEVICE AND COMPUTER STORAGE MEDIUM FOR COMMUNICATION

TECHNICAL FIELD

Embodiments of the present disclosure generally relate to the field of telecommunication, and in particular, to methods, devices and computer storage media for communication.

BACKGROUND

In the 3GPP meeting RAN #86, it is agreed to support enhancement on multi-beam operation, mainly targeting the frequency range 2 (FR2) while also applicable to the frequency range 1 (FR1). It is agreed to identify and specify features to facilitate more efficient (lower latency and overhead) downlink (DL) and uplink (UL) beam management. For example, it is proposed to support common beam(s) for data and control information transmission/reception for both DL and UL, especially for intra-band carrier aggregation (CA). It is also proposed to support a unified Transmission Configuration Indication (TCI) framework for DL and UL beam indication. However, the current 3GPP specifications provide no details on the common beam(s) for data and control information transmission/reception.

SUMMARY

In general, example embodiments of the present disclosure provide methods, devices and computer storage media for beam management.

In a first aspect, there is provided a method of communication. The method comprises transmitting, from a network device to a terminal device, a first physical downlink control channel (PDCCH) indicating a transmission configuration indication (TCI) state, wherein the TCI state is configured to the terminal device for monitoring a PDCCH in a control resource set (CORESET) and receiving a physical downlink shared channel (PDSCH) scheduled by the monitored PDCCH; applying, based on a first time threshold, the TCI state for transmitting a second PDCCH in the CORESET to the terminal device; and applying, based on a second time threshold, the TCI state for transmitting a PDSCH to the terminal device.

In a second aspect, there is provided a method of communication. The method comprises receiving, at a terminal device and from a network device, a first PDCCH indicating a TCI state, wherein the TCI state is configured to the terminal device for monitoring a PDCCH in a CORREST and receiving a PDSCH scheduled by the monitored PDCCH; applying, based on a first time threshold, the TCI state for monitoring a second PDCCH transmitted from the network device in the CORESET; and applying, based on a second time threshold, the TCI state for receiving a PDSCH transmitted from the network device.

In a third aspect, there is provided a network device. The network device comprises a processor and a memory coupled to the processor. The memory stores instructions that when executed by the processor, cause the network device to perform actions. The actions comprise transmitting, to a terminal device, a first PDCCH indicating a TCI state, wherein the TCI state is configured to the terminal device for monitoring a PDCCH in a CORESET and receiving a PDSCH scheduled by the monitored PDCCH; applying, based on a first time threshold, the TCI state for transmitting a second PDCCH in the CORESET to the terminal device; and applying, based on a second time threshold, the TCI state for transmitting a PDSCH to the terminal device.

In a fourth aspect, there is provided a terminal device. The terminal device comprises a processor and a memory coupled to the processor. The memory stores instructions that when executed by the processor, cause the terminal device to perform actions. The actions comprise receiving, from a network device, a first PDCCH indicating a TCI state, wherein the TCI state is configured to the terminal device for monitoring a PDCCH in a CORREST and receiving a PDSCH scheduled by the monitored PDCCH; applying, based on a first time threshold, the TCI state for monitoring a second PDCCH transmitted from the network device in the CORESET; and applying, based on a second time threshold, the TCI state for receiving a PDSCH transmitted from the network device.

In a fifth aspect, there is provided a computer readable medium having instructions stored thereon. The instructions, when executed on at least one processor, cause the at least one processor to perform the method according to the above first or second aspect.

In a sixth aspect, there is provided a computer program product that is stored on a computer readable medium and includes machine-executable instructions. The machine-executable instructions, when being executed, cause a machine to perform the method according to the above first or second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
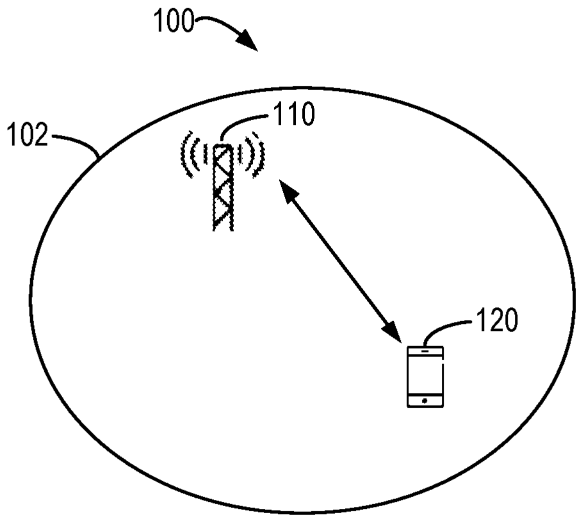
FIG. 1 illustrate an example communication network in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'some embodiments' and 'an embodiment' are to be read as 'at least some embodiments.' The term 'another embodiment' is to be read as 'at least one other embodiment.' The terms 'first,' 'second,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

In the 3GPP meeting RAN #86, it is agreed to support enhancement on multi-beam operation, mainly targeting FR2 while also applicable to FR1. It is agreed to identify and specify features to facilitate more efficient (lower latency and overhead) DL and UL beam management. For example, it is proposed to support common beam(s) for data and control information transmission/reception for both DL and UL, especially for intra-band CA. It is also proposed to support a unified TCI framework for DL and UL beam indication. However, the current 3GPP specifications provide no details on the common beam(s) for data and control information transmission/reception. For example, it is unclear how to update the common beam used for PDCCH and PDSCH and when to apply the updated beam. It is unclear how to ensure the common beam is updated successfully. In addition, it is unclear the impact of such update of the common beam on beam failure detection.

Embodiments of the present disclosure provide a solution for beam management, so as to solve the above problems and one or more of other potential problems. According to this solution, a first PDCCH indicating a TCI state is transmitted from a network device to a terminal device. The TCI state is configured to the terminal device for monitoring a PDCCH in a CORESET and receiving a PDSCH scheduled by the monitored PDCCH. The terminal device applies, based on a first time threshold, the TCI state for monitoring a second PDCCH transmitted from the network device in the CORESET. The terminal device applies, based on a second time threshold, the TCI state for receiving a PDSCH transmitted from the network device. As such, a common beam used for PDCCH and PDSCH, which is indicated by a common TCI state, can be updated and the updated beam can be applied for PDCCH and PDSCH transmission/reception.

Principle and implementations of the present disclosure will be described in detail below with reference to FIG. 1-9.

FIG. 1 shows an example communication network 100 in which implementations of the present disclosure can be implemented. The network 100 includes a network device 110 and a terminal device 120 served by the network device 110. The network 100 can provide at least one serving cell 102 to serve the terminal device 120. It is to be understood that the number of network devices, terminal devices and/or serving cells is only for the purpose of illustration without suggesting any limitations. The network 100 may include any suitable number of network devices, terminal devices and/or serving cells adapted for implementing implementations of the present disclosure.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. For the purpose of discussion, in the following, some embodiments will be described with reference to UE as an example of the terminal device 120.

As used herein, the term 'network device' or 'base station' (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

In one embodiment, the terminal device 120 may be connected with a first network device and a second network device (not shown in FIG. 1). One of the first network device and the second network device may be in a master node and the other one may be in a secondary node. The first network device and the second network device may use different radio access technologies (RATs). In one embodiment, the first network device may be a first RAT device and the second network device may be a second RAT device. In one embodiment, the first RAT device may be an eNB and the second RAT device is a gNB. Information related to different RATs may be transmitted to the terminal device 120 from at least one of the first network device and the second network device. In one embodiment, first information may be transmitted to the terminal device 120 from the first network device and second information may be transmitted to the terminal device 120 from the second network device directly or via the first network device. In one embodiment, information related to configuration for the terminal device configured by the second network device may be transmitted from the second network device via the first network device. Information related to reconfiguration for the terminal device configured by the second network device may be transmitted to the terminal device from the second network device directly or via the first network device. The information may be transmitted via any of the following: Radio Resource Control (RRC) signaling, Medium Access Control (MAC) control element (CE) or Downlink Control Information (DCI).

In the communication network 100, the network device 110 can communicate data and control information to the terminal device 120 and the terminal device 120 can also communication data and control information to the network device 110. A link from the network device 110 to the terminal device 120 is referred to as a downlink (DL), while a link from the terminal device 120 to the network device 110 is referred to as an uplink (UL).

The communications in the network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In addition to normal data communications, the network device 110 may send a RS to the terminal device 120 in a downlink. Similarly, the terminal device 120 may transmit a RS to the network device 110 in an uplink. Generally speaking, a RS is a signal sequence (also referred to as "RS sequence") that is known by both the network device 110 and the terminal devices 120. For example, a RS sequence may be generated and transmitted by the network device 110 based on a certain rule and the terminal device 120 may deduce the RS sequence based on the same rule. For another example, a RS sequence may be generated and transmitted by the terminal device 120 based on a certain rule and the network device 110 may deduce the RS sequence based on the same rule. Examples of the RS may include but are not limited to downlink or uplink Demodulation Reference Signal (DMRS), CSI-RS, Sounding Reference Signal (SRS), Phase Tracking Reference Signal (PTRS), Tracking Reference Signal (TRS), fine time-frequency Tracking Reference Signal (TRS), CSI-RS for tracking, Positioning Reference Signal (PRS) and so on.

In addition to normal data communications, the network device 110 may transmit DCI via a PDCCH to the terminal device 120. The DCI may indicate resource allocation for data transmission in a DL or UL. Concurrently, a DMRS associated with the PDCCH may also be transmitted from the network device 110 to the terminal device 120. The DMRS may be used by the terminal device 120 for channel demodulation. Then, the terminal device 120 may attempt to blindly decode the DCI in a control information set (CORESET). As used herein, a "CORESET" refers to a set of resource element groups (REGs) within which the terminal device attempts to blindly decode the DCI. A search space indicating the start time and a periodicity for monitoring a PDCCH in the CORESET may be indicated to the terminal device 120. In response to decoding the DCI successfully, the terminal device 120 may perform the UL and/or DL data transmission (for example, data transmission via PDSCH and/or Physical Uplink Shared Channel (PUSCH)) with the network device 110 accordingly.

The network device 110 may communicate data and control information to the terminal device 120 via a plurality of beams (also referred to as "DL beams"). The terminal device 120 may also communicate data and control information to the network device 110 via a plurality of beams (also referred to as "UL beams"). In 3GPP specifications for new radio (NR), a beam is also defined and indicated by parameters of a transmission configuration indicator. For example, there may be a transmission configuration indication (TCI) field in DCI. A value of the TCI field may be referred to as a "TCI codepoint". A TCI codepoint may indicate one or more TCI states. Each TCI state contains parameters for configuring a quasi co-location (QCL) relationship between one or two DL reference signals and the DMRS ports of the PDSCH, the DMRS ports of PDCCH or the CSI-RS ports of a CSI-RS resource.

Figure 2:
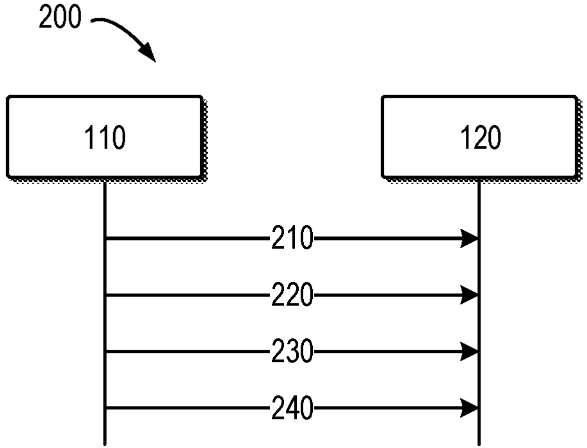
FIG. 2 illustrates a signaling chart for beam management in accordance with some embodiments of the present disclosure.

FIG. 2 illustrates a signaling chart for beam management in accordance with some embodiments of the present disclosure. For the purpose of discussion, the process 200 will be described with reference to FIG. 1. The process 200 may involve the network device 110 and the terminal device 120 as shown in FIG. 1.

As shown in FIG. 2, the network device 110 configures 210 a first TCI state or a first pair of TCI states (also referred to as "TCI state A" in the following) to the terminal device 120 for monitoring a PDCCH in a CORESET and/or receiving a PDSCH scheduled by the monitored PDCCH.

In some embodiments, the network device 110 may configure a set of TCI states/TCI state pairs (represented as "T1") to the terminal device 120 via RRC signaling and/or MAC CE. For example, the set of TCI states/TCI state pairs T1 may include P1 TCI states/TCI state pairs, where P1 is an integer and $0 \leq P1 \leq 128$. In some embodiments, for example, the network device 110 may configure, via RRC signaling, a first set of TCI states/TCI state pairs (represented as "T0") to the terminal device 120 and then activate, via MAC CE, the set of TCI states/TCI state pairs T1 selected from the first set of TCI states/TCI state pairs T0. In some embodiments, the set of TCI states/TCI state pairs T1 may be the same as those TCI states (for example, up to 8 TCI states) mapping to the TCI codepoints in one component carrier (CC)/DL bandwidth part (BWP) or in a set of CCs/DL BWPs. In some embodiments, the set of TCI states/TCI state pairs T1 may be used by the terminal device 120 for PDSCH and/or PDCCH reception. For example, the first TCI state or the first pair of TCI states (that is, TCI state A) selected from the set of TCI states/TCI state pairs T1 may be indicated, via DCI, to the terminal device 120 for monitoring a PDCCH in a CORESET and receiving a PDSCH scheduled by the monitored PDCCH. That is, TCI state A indicates a common beam used for PDCCH and PDSCH.

As shown in FIG. 2, the network device 110 transmits 220, to the terminal device 120, a PDCCH for updating the first TCI state or the first pair of TCI states (that is, TCI state A) to a second TCI state or a second pair of TCI states (also referred to as "TCI state B" in the following).

In the following, the terms "TCI state", "a pair of TCI states", "TCI state pair", "set of QCL parameter(s)", "QCL parameter(s)", "QCL assumption" and "QCL configuration" can be used interchangeably. The terms "TCI state A", "first TCI state", "first pair of TCI states", "first set of QCL parameter(s)", "first QCL parameter(s)", "first QCL assumption" and "first QCL configuration" can be used interchangeably. The terms "TCI state B", "second TCI state", "second pair of TCI states", "second set of QCL parameter(s)", "second QCL parameter(s)", "second QCL assumption" and "second QCL configuration" can be used interchangeably.

In some embodiments, the network device 110 may transmit a PDCCH for updating at least one of TCI states/TCI state pairs in T1. In some embodiments, the PDCCH may indicate another set of TCI states/TCI state pairs T2 for replacing the set of TCI states/TCI state pairs T1. For example, the set of TCI states/TCI state pairs T2 may include P2 TCI states/TCI state pairs, where P2 is an integer and $0 \le P2 \le 128$. In some embodiments, the PDCCH may only update a subset of the set of TCI states/TCI state pairs T1.

In some embodiments, the field in the PDCCH for updating at least one of TCI states/TCI state pairs in T1 may be a new field different from the TCI field in DCI. In some embodiments, the PDCCH for updating at least one of TCI states/TCI state pairs in T1 may be a special PDCCH which is different from the PDCCH for PDSCH scheduling. For example, the special PDCCH may be associated with a new Radio Network Temporary Identity (RNTI) and/or a new format. In some embodiments, if the value of the new field equals to a predetermined value (for example, 0), it means that no update is to be performed on the set of TCI states/TCI state pairs T1. In some embodiments, if the new field and the TCI field are included in the same PDCCH, the TCI field may be ignored, or the TCI state(s) indicated by the TCI field is to be updated after a predetermined/configured time threshold.

In some embodiments, as described above, TCI state A selected from the set of TCI states/TCI state pairs T1 may be configured to the terminal device 120 for monitoring a PDCCH in a CORESET and receiving a PDSCH scheduled by the monitored PDCCH. In some embodiments, the network device 110 may transmit a PDCCH for updating TCI state A to TCI state B. TCI state B is to be used by the terminal device 120 for monitoring a PDCCH in the CORESET and receiving a PDSCH scheduled by the monitored PDCCH.

In some embodiments, the second TCI state or the second pair of TCI states (that is, TCI state B) may also be selected from the set of TCI states/TCI state pairs T1. Alternatively, in other embodiments, the second TCI state or the second pair of TCI states (that is, TCI state B) may not be selected from the set of TCI states/TCI state pairs T1. For example, the second TCI state or the second pair of TCI states (that is, TCI state B) may be selected from the set of TCI states/TCI state pairs T2.

In some embodiments, the field in the PDCCH for updating the TCI state may reuse the TCI field in DCI.

In some embodiments, if the value of the TCI field equals to a predetermined value (for example, 0), it may indicate that the TCI state will not be updated. In this event, the current or latest TCI state configured for the CORESET (for example, TCI state A) will be applied to the PDCCH in the CORESET and the PDSCH scheduled by the PDCCH. Other values of the TCI field may indicate new TCI state(s) for PDCCH and PDSCH.

In some embodiments, if the TCI state indicated in the TCI field is different from the current or latest TCI state (for example, TCI state A) used for PDCCH and PDSCH transmission/reception, the TCI state A is to be updated to the TCI state (that is, TCI state B) indicated in the TCI field.

In some embodiments, if the TCI codepoint indicates two different TCI states, one of the two different TCI states may be applied to PDCCH transmission/reception. For example, the first TCI state in the two TCI states may be applied to PDCCH transmission/reception. For another example, the one of the two different TCI states or both of the two different TCI states may be applied to PDSCH transmission/reception. For another example, the first TCI state in the two different TCI states may be applied to PDSCH transmission/reception.

In some embodiments, if the TCI codepoint indicates two different TCI states, the two different TCI states may be applied to PDCCH transmission(s)/reception(s). In this event, if repetitions for PDCCH are enabled, for example, there are first and second PDCCH transmission occasions for the same PDCCH, one of the two different TCI states may be applied to the first PDCCH transmission occasion and the other of the two different TCI states may be applied to the second PDCCH transmission occasion. For example, if repetitions for PDCCH are enabled, two different TCI states may be configured for PDCCH or a CORESET. There may be two PDCCH transmission/reception occasions for the same PDCCH. In this case, one of the two different TCI states may be applied to the first PDCCH transmission/reception occasion and the other of the two different TCI states may be applied to the second PDCCH transmission/reception occasion.

In some embodiments, if the value of the TCI field equals to a predetermined value (for example, value 0), it may indicate that a common TCI state is to be used for PDCCH and PDSCH transmission/reception. For example, the TCI state to be used for PDSCH transmission/reception may be the same as the TCI state configured for the CORESET. Additionally, other values of the TCI field, which are different from the predetermined value, each may indicate a TCI state to be used for PDSCH transmission/reception. In this event, the TCI state configured for the CORESET may be used for PDCCH transmission/reception.

In some embodiments, a PDCCH in a CORESET/search space W can only update TCI state(s) for PDCCH(s) monitored in the same CORESET/search space W. For example, an identifier (ID) of the CORESET/search space W may be 0. For another example, there may be no need to indicate the ID of the CORESET/search space in the updated TCI state (for example, the field for TCI state update). In some embodiments, a PDCCH in a CORESET/search space W can update TCI state(s) for PDCCH(s) monitored in a CORESET/search space V. For example, the CORESET/search space V may be different from or with the same as the CORESET/search space W. For example, the ID of the CORESET/search space V may be included in the field for TCI state update. Alternatively, in other embodiments, a PDCCH in a CORESET/search space W can only update TCI state(s) for PDCCH(s) monitored in a different CORESET/search space V. For example, the ID of the CORESET/search space V may be included in the field for TCI state update.

In the following, the terms "time threshold", "threshold" and "timing" can be used interchangeably. The terms "transmit", "receive", "transmission", "reception", "scheduling", "schedule", "buffering", "buffer", "detection", "detecting", "detect", "monitor" and "monitoring" can be used interchangeably. The terms "predetermined", "determined", "configured", "indicated", "signaled" and "reported" can be used interchangeably. The terms "configuration", "indication", "information", "signaling" and "parameter" can be used interchangeably.

As shown in FIG. 2, the network device 110 applies 230, based on a first time threshold X, the second TCI state (that is, TCI state B) for transmitting a second PDCCH in the CORESET to the terminal device 120. Correspondingly, the terminal device 120 applies 230, based on the first time threshold X, the second TCI state (that is, TCI state B) for monitoring the second PDCCH in the CORESET. The network device 110 applies 240, based on a second time threshold Y, the second TCI state (that is, TCI state B) for transmitting a PDSCH to the terminal device 120. Correspondingly, the terminal device 120 applies 240, based on the second time threshold Y, the second TCI state (that is, TCI state B) for receiving the PDSCH transmitted from the network device 110.

In some embodiments, the first time threshold X may be the same as or different from the second time threshold Y In some embodiments, the first time threshold X and/or the second time threshold Y may be the same as the threshold timeDurationForQCL as specified in TS 38.214 or TS 38.306.

In some embodiments, the first time threshold X may indicate a predetermined/configured time period. The predetermined/configured time period may be Xi ms/us/slots/symbols/sub-slot, where Xi is an integer. For example, 1≤Xi≤336. For example, the predetermined time period Xi may be 7, 14 or 28 symbols, such as, 7, 14 or 28 symbols if the subcarrier spacing is 60 KHz and 14 or 28 symbols if the subcarrier spacing is 120 KHz. For another example, the predetermined time period Xi may be L slots, where L is an integer and L may be any one of {0, 1, 2, 3, 4, 5, 6, 7, 8}.

In some embodiments, the second time threshold Y may indicate a predetermined/configured time period. The predetermined/configured time period may be Yi ms/us/slots/symbols/sub-slot, where Yi is an integer. For example, 1≤Yi≤336. For example, the predetermined time period Yi may be 7, 14 or 28 symbols, such as, 7, 14 or 28 symbols if the subcarrier spacing is 60 KHz and 14 or 28 symbols if the subcarrier spacing is 120 KHz. For another example, the predetermined time period Yi may be may be M slots, where Mis an integer and M may be any one of {0, 1, 2, 3, 4, 5, 6, 7, 8}.

In some embodiments, the first time threshold X may indicate a predetermined/configured time period after the last symbol of the PDCCH (represented as "PDCCH P") updating the first TCI state to the second TCI state, or after the first or last symbol of the PDSCH scheduled by the PDCCH P. For example, the predetermined/configured time period may be Xi ms/us/slots/symbols/sub-slot. For example, the predetermined time period may be 7, 14 or 28 symbols, such as, 7, 14 or 28 symbols if the subcarrier spacing is 60 KHz and 14 or 28 symbols if the subcarrier spacing is 120 KHz. For example, the predetermined/configured time period may depend on UE capability reported by the terminal device 120. In this event, the second TCI state (that is, TCI state B) may be applied to PDCCH transmission/reception after the first time threshold X from the last symbol of the PDCCH P, or from the first or last symbol of the PDSCH scheduled by the PDCCH P.

Figure 3A:
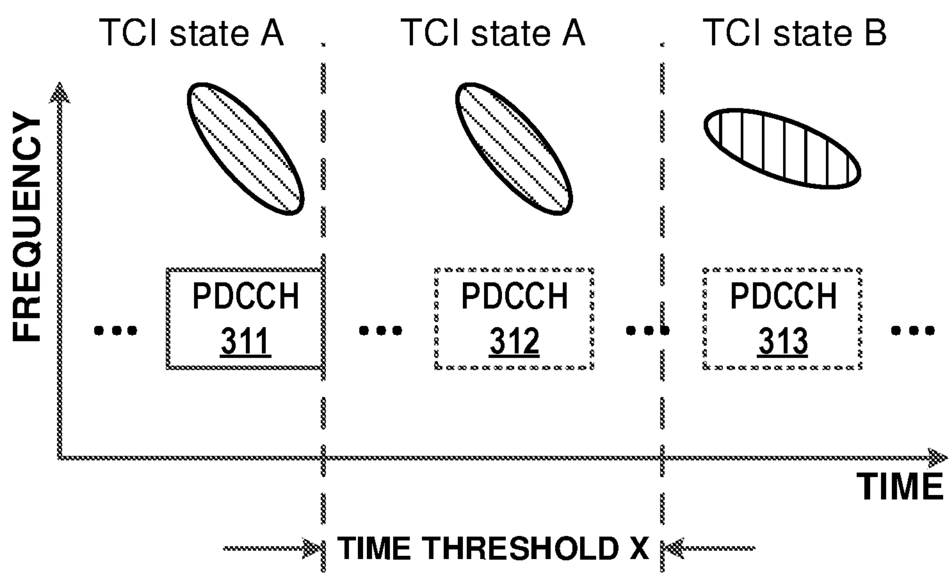
FIGS. 3A and 3B illustrate examples of beam management in accordance with some embodiments of the present disclosure.

FIG. 3A illustrates an example of such embodiments. In the example of FIG. 3A, it is assumed that TCI state A is configured to the terminal device 120 for monitoring a PDCCH in a CORESET/search space. As shown in FIG. 3A, PDCCH 311 may be transmitted from the network device 110 to the terminal device 120 for updating TCI state A used for PDCCH and/or PDSCH to TCI state B. In this event, for example, TCI state B may be applied to PDCCH transmission/reception after the first time threshold X from the last symbol of the PDCCH 311. That is, the terminal device 120 may still use TCI state A for monitoring PDCCH 312 in the CORESET/search space. After the first time threshold X from the last symbol of the PDCCH 311, the terminal device 120 may apply TCI state B for monitoring PDCCH 313 in the CORESET.

In some embodiments, the first time threshold X may indicate a predetermined time period from slot n where the PDCCH P or a PDSCH scheduled by the PDCCH P is transmitted/received. For example, the predetermined time period may be Xi ms/us/slots/symbols/sub-slots. In this event, the second TCI state (that is, TCI state B) may be applied to PDCCH transmission/reception after the first time threshold X from the slot n where the PDCCH P or a PDSCH scheduled by the PDCCH P is transmitted/received.

In some embodiments, a PUCCH carrying HARQ-ACK information corresponding to the PDCCH P or corresponding to a PDSCH scheduled by the PDCCH P may be transmitted from the terminal device 120 to the network device 110. The first time threshold X may indicate a predetermined time period from the last symbol of the PUCCH. For example, the predetermined time period may be Xi ms/us/slots/symbols/sub-slots. In this event, the second TCI state (that is, TCI state B) may be applied to PDCCH transmission/reception in a next slot after the first time threshold X from the last symbol of the PUCCH.

In some embodiments, a PUCCH carrying HARQ-ACK information corresponding to the PDCCH P or corresponding to a PDSCH scheduled by the PDCCH P may be transmitted from the terminal device 120 to the network device 110 in slot n. The first time threshold X may indicate a predetermined time period from the slot n. For example, the predetermined time period may be Xi ms/us/slots/symbols/sub-slots, such as, 4 slots. In this event, the second TCI state (that is, TCI state B) may be applied to PDCCH transmission/reception in a next slot after the first time threshold X from the slot n where the PUCCH carrying the HARQ-ACK information is transmitted/received. For example, the PDCCH P may schedule a PDSCH or no PDSCH in this case.

Figure 3B:
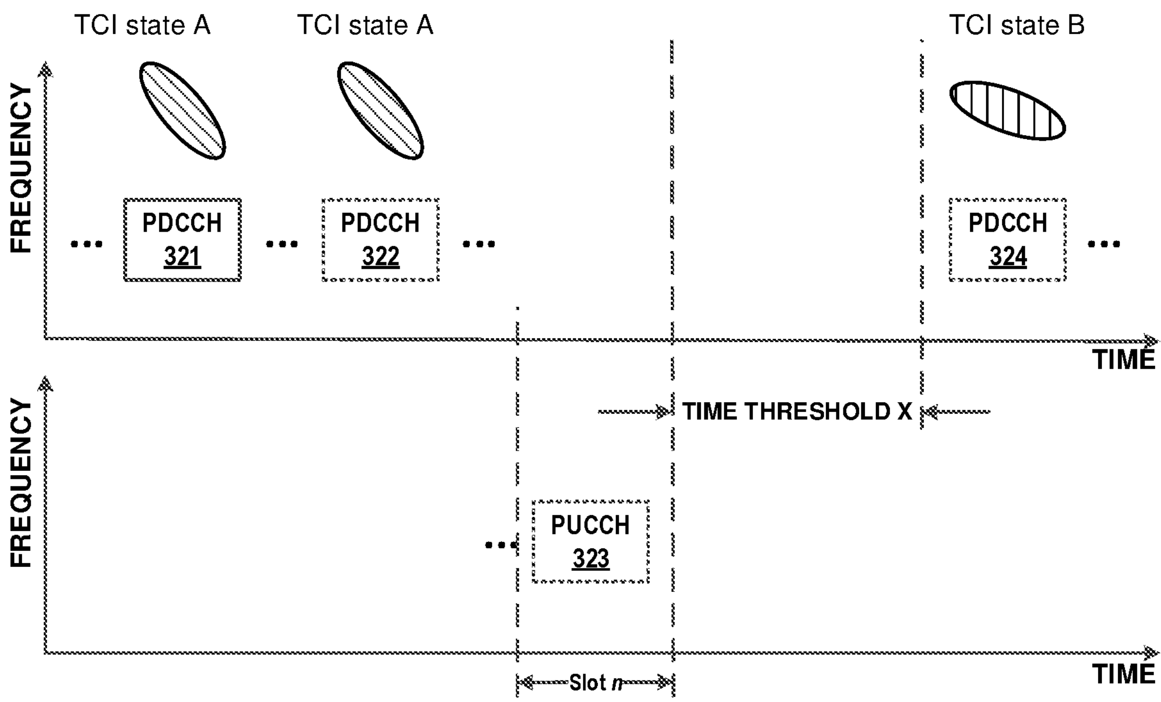

FIG. 3B illustrates an example of such embodiments. In the example of FIG. 3B, it is assumed that TCI state A is configured to the terminal device 120 for monitoring a PDCCH in a CORESET/search space. As shown in FIG. 3B, PDCCH 321 may be transmitted from the network device 110 to the terminal device 120 for updating TCI state A used for PDCCH and/or PDSCH to TCI state B. PUCCH 323 carrying HARQ-ACK information corresponding to the PDCCH 321 may be transmitted from the terminal device 120 to the network device 110 in slot n. In this event, for example, TCI state B may be applied to PDCCH transmission/reception in a next slot after the first time threshold X from slot n. That is, the terminal device 120 may still use TCI state A for monitoring PDCCH 322 in the CORESET/search space. After the first time threshold X from slot n, the terminal device 120 may apply TCI state B in a next slot for monitoring PDCCH 324 in the CORESET.

In some embodiments, if the terminal device 120 transmits, in slot n, a PUCCH with HARQ-ACK information corresponding to the PDCCH updating the TCI state, the updated TCI state may be applied to corresponding PDCCH and/or PDSCH starting from a next slot after slot n+X or after slot n+Y. If the terminal device 120 transmits, in slot n, a PUCCH with HARQ-ACK information corresponding to the PDSCH scheduled by the PDCCH updating the TCI state, the updated TCI state may be applied to corresponding PDCCH and/or PDSCH starting from a next slot after slot n+X or after slot n+Y. In some embodiments, the length of a slot is determined based on the subcarrier spacing configuration for the PUCCH.

In some embodiments, the PDCCH P may be used to update the TCI state for a CORESET/search space. In some embodiments, a PDSCH may be scheduled by the PDCCH P. For example, the terminal device 120 may receive the PDSCH transmitted from the network device 110. For another example, the PDSCH scheduling may be ignored if the TCI state is updated.

In some embodiments, if the PDCCH P transmitted from the network device 110 to the terminal device 120 is used to update the TCI state for PDCCH and/or PDSCH, the terminal device 120 may provide HARQ-ACK information in response to the PDCCH P. For example, if the PDCCH P is received in slot m and k1 is indicated by a value of a PDSCH-to-HARQ_feedback timing indicator field in the PDCCH P, then the HARQ-ACK information will be transmitted from the terminal device 120 in slot m+k1. In some embodiments, if the PDCCH P is received in slot m and k1 is indicated by a value of a PDSCH-to-HARQ_feedback timing indicator field in the PDCCH P, and if k0 is indicated for PDSCH scheduling, then first and second HARQ-ACK information will be transmitted from the terminal device 120 to the network device 110. For example, the first HARQ-ACK information corresponding to the PDCCH P may be transmitted in slot m+k1 and the second HARQ-ACK information corresponding to the PDSCH scheduled by the PDCCH P may be transmitted in slot m+k0+k1. In some embodiments, for type 1 HARQ-ACK codebook, a location in the Type 1 HARQ-ACK codebook for the first HARQ-ACK information corresponding to the PDCCH P may be indicated/configured by the Time domain resource assignment field in the PDCCH P. This field may also be used for scheduling a PDSCH or a virtual PDSCH. In some embodiments, k0 represents the number of slots (where k0 is an integer and 0≤k0≤32) which is indicated/configured by the time domain resource assignment for PDSCH (for example, pdsch-TimeDomainAllocationList). In some embodiments, k1 represents the number of slots (where k1 is an integer and 0≤k1≤32) which is indicated by a value of a PDSCH-to-HARQ_feedback timing indicator field in a PDCCH.

Figure 4:
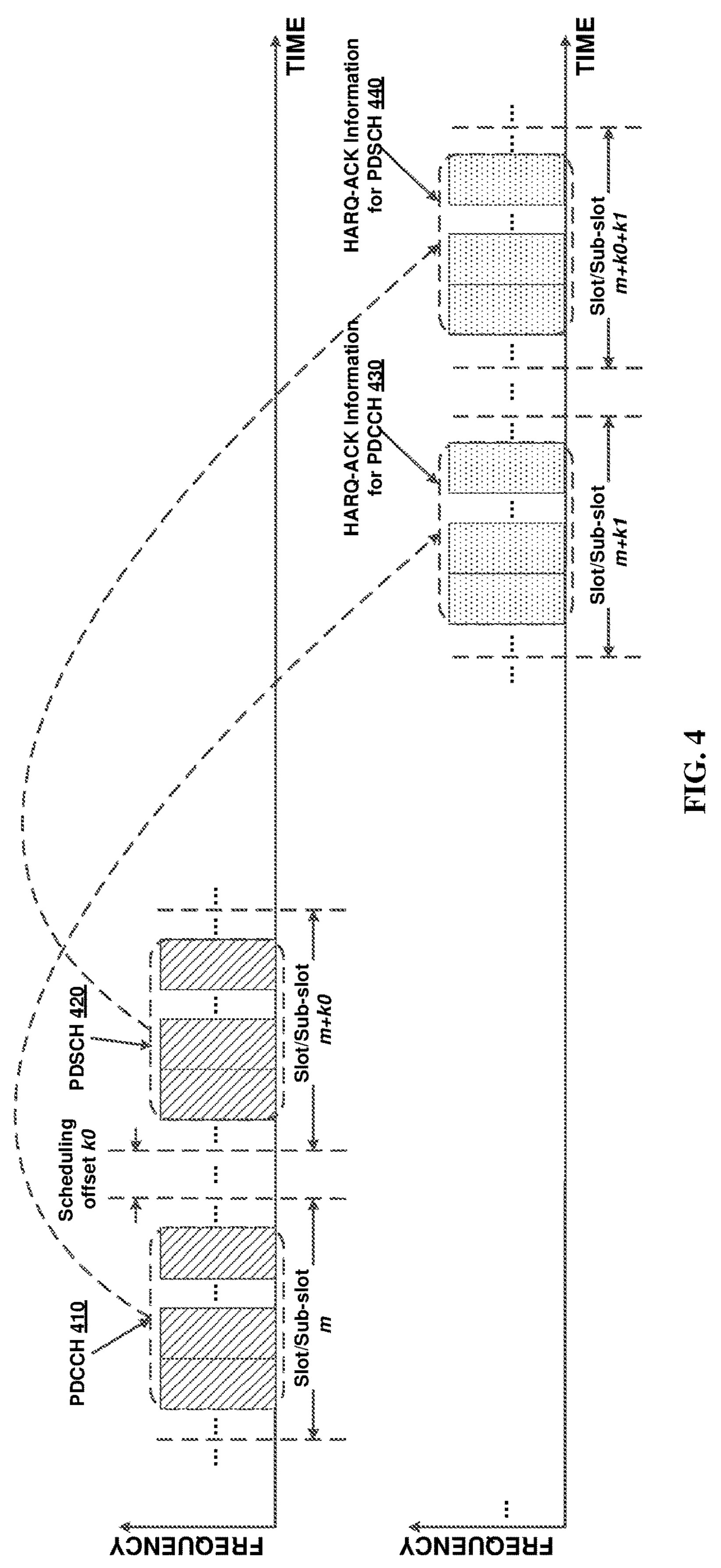
FIG. 4 illustrates an example of HARQ-ACK feedback in accordance with some embodiments of the present disclosure.

FIG. 4 illustrates an example of HARQ-ACK feedback in accordance with some embodiments of the present disclosure. As shown in FIG. 4, for example, the terminal device 120 may receive a PDCCH 410 which is used to update the TCI state for PDCCH and/or PDSCH in slot/sub-slot m. The PDCCH 410 may schedule a PDSCH 420, where the scheduling offset is k0 slots/sub-slots. In this case, the terminal device 120 may receive the PDSCH 420 scheduled by the PDCCH 410 in slot/sub-slot m+k0. For example, k1 is indicated by a value of a PDSCH-to-HARQ_feedback timing indicator field in the PDCCH 410. In this case, the terminal device 120 transmit first HARQ-ACK information 430 corresponding to the PDCCH 410 in slot/sub-slot m+k1 and transmit second HARQ-ACK information 440 corresponding to the PDSCH 420 in slot/sub-slot m+k0+k1.

In some embodiments, the first time threshold X may be the same as or different from the second time threshold Y Depending on the relationship between the first time threshold X and the second time threshold Y, the TCI state(s) applied for PDCCH and/or PDSCH may different in different cases.

Figure 5:
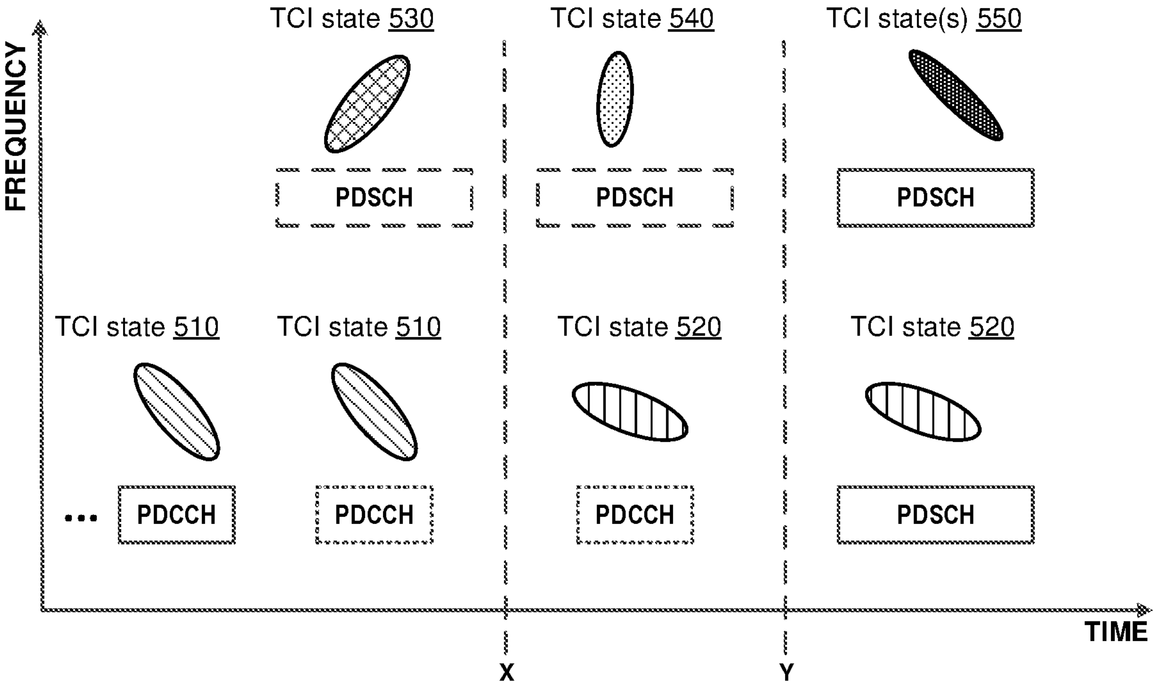
FIG. 5 illustrates an example of beam management in accordance with some embodiments of the present disclosure.

Table 1 illustrates the TCI state(s) applied for PDCCH and/or PDSCH if the first time threshold X is not later than the second time threshold Y (that is, X≤Y). FIG. 5 illustrates diagrams of example embodiments as shown in Table 1. In FIG. 5, the first TCI state (that is, TCI state A) is represented as TCI state 510, and the second TCI state (that is, TCI state B) is represented as TCI state 520.

TABLE 1

| Cases | Beam/TCI state/QCL parameter(s) |
|---|---|
| Timing ≥ Y | PDSCH:<br>TCI state 520 (that is, TCI state B); or<br>TCI state(s) 550 indicated in the TCI field.<br>PDCCH in the CORESET/search space:<br>TCI state 520 (that is, TCI state B). |
| X ≤ Timing ≤ Y | PDSCH:<br>TCI state 520 (that is, TCI state B) or TCI state 540 configured for the lowest CORESET ID in the latest slot if the updated CORESET is not the lowest CORESET ID in the latest slot; and<br>the updated TCI state 520 (that is, TCI state B) if the updated CORESET is the lowest CORESET ID in the latest slot for PDSCH.<br>PDCCH in the CORESET/search space:<br>TCI state 520 (that is, TCI state B). |
| Timing ≤ X | PDSCH:<br>TCI state 530 configured for the lowest CORESET ID in the latest slot if the updated CORESET is not the lowest CORESET ID in the latest slot; and<br>TCI state 510 (that is, TCI state A) before the updating if the CORESET to be updated is the lowest CORESET ID in the latest slot for PDSCH.<br>PDCCH in the CORESET/search space:<br>TCI state 510 (that is, TCI state A). |

Figure 6:
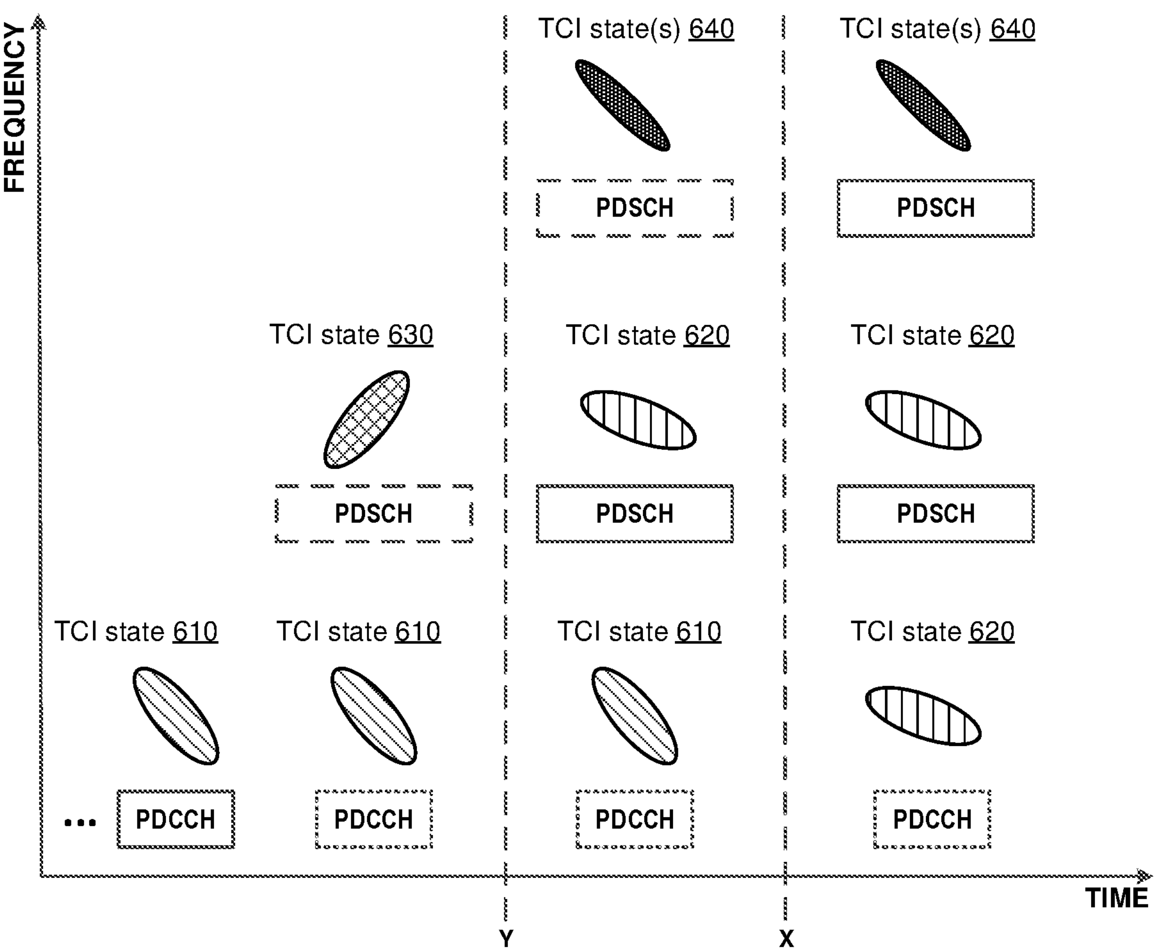
FIG. 6 illustrates an example of beam management in accordance with some embodiments of the present disclosure.

Table 2 illustrates the T state(s) applied for PDCCH and/or PDSCH if the first time threshold X is not earlier than the second time threshold Y (that is, X>Y). FIG. 6 illustrates diagrams of example embodiments as shown in Table 2. In FIG. 6, the first TCI state (that is, TCI state A) is represented as TCI state 610, and the second TCI state (that is, TCI state B) is represented as TCI state 620.

TABLE 2

| Cases | Beam/TCI state/QCL parameter(s) |
|---|---|
| Timing ≥ X | PDSCH:<br>TCI state 620 (that is, TCI state B); or<br>TCI state(s) 640 indicated in the TCI field.<br>PDCCH in the CORESET/search space:<br>TCI state 620 (that is, TCI state B). |
| Y ≤ Timing ≤ X | PDSCH:<br>TCI state 620 (that is, TCI state B); or<br>TCI state(s) 640 indicated in the TCI field.<br>PDCCH in the CORESET/search space:<br>TCI state 610 (that is, TCI state A). |
| Timing ≤ Y | PDSCH:<br>TCI state 630 configured for the lowest CORESET ID in the latest slot if the updated CORESET is not the lowest CORESET ID in the latest slot; and<br>TCI state 610 (that is, TCI state A) before the updating if the CORESET to be updated is the lowest CORESET ID in the latest slot for PDSCH.<br>PDCCH in the CORESET/search space:<br>TCI state 610 (that is, TCI state A). |

In some embodiments, in response to the TCI state(s) used for a CORESET/search space being updated from the first TCI state (that is, TCI state A) to the second TCI state (that is, TCI state B), a set of reference signal (RS) resources used for beam failure detection may be updated accordingly.

In some embodiments, if the terminal device 120 is configured with a set $\overline{q}_0$ of periodic CSI-RS resource configuration indexes by failureDetectionResources or beamFailureDetectionResourceList, and/or if there is at least one periodic CSI-RS resource (represented as "RS1") in $\overline{q}_0$ is QCLed (for example, the QCL type is 'QCL-TypeD') with the periodic CSI-RS (with QCL-TypeD configuration) in TCI state A, and/or if there is periodic CSI-RS (with QCL-TypeD configuration) (represented as "RS2") in TCI state B, RS1 may be replaced by RS2 in $\overline{q}_0$ for beam failure detection. In some embodiments, the replacement may be applied after RS2 is applied after a predetermined time threshold. In some embodiments, for example, RS2 may include only one RS port. In some embodiments, if RS2 includes more than one RS port, and if there is a periodic CSI-RS (represented as "RS3") with only one RS port is QCLed (for example, the QCL type is 'QCL-TypeD') with RS2, RS1 may be replaced by RS3 in $\overline{q}_0$ for beam failure detection. In some embodiments, if RS2 includes more than one RS port, and if there is more than one periodic CSI-RS with only one RS port is QCLed (for example, the QCL type is 'QCL-TypeD') with RS2, RS1 may be replaced by the periodic CSI-RS with the lowest RS index in $\overline{q}_0$ for beam failure detection.

In some embodiments, if the terminal device 120 is not configured/provided with a set $\overline{q}_0$ of periodic CSI-RS resource configuration indexes by failureDetectionResources or beamFailureDetectionResourceList, the terminal device 120 may determine the set $\overline{q}_0$ to include periodic CSI-RS resource configuration indexes with the same values as the RS indexes in the RS sets indicated by the TCI state or indicated by the updated TCI state after the updated TCI state is applied for respective CORESETs that the terminal device 120 uses for monitoring PDCCH. If there are two RS indexes in a TCI state, the set $\overline{q}_0$ may include RS indexes with QCL-TypeD configuration for the corresponding TCI states. The terminal device 120 may expect the set $\overline{q}_0$ to include up to two RS indexes. The terminal device 120 may expect a single port RS in the set $\overline{q}_0$.

In some embodiments, there may be M CORESETs each with one TCI state, and there may be N periodic CSI-RS (with one RS port) resource configuration indexes with the same values as the RS indexes in the RS sets indicated by the TCI state, where N<=M. In this case, the terminal device 120 may determine up to two RS indexes from the N periodic CSI-RS resource configuration indexes for the set $\overline{q}_0$. If the TCI states for at least one CORESETs are updated, after the updated TCI state are applied, there may be L periodic CSI-RS (with one RS port) resource configuration indexes with the same values as the RS indexes in the RS sets indicated by the TCI state, where L<=M. In this case, the terminal device 120 may determine up to two RS indexes from the L periodic CSI-RS resource configuration indexes for the set $\overline{q}_0$.

In some embodiments, if the periodic CSI-RS resource configuration indexes with the same values as the RS indexes in the RS sets (e.g., RS1) in the configured/indicated TCI state for a CORESET are included in the set $\overline{q}_0$, and if the TCI state for the CORESET is updated, and if there are new periodic CSI-RS resource configuration indexes with the same values as the RS indexes in the RS sets (e.g., RS2) in the updated TCI state for the CORESET, RS1 may be replace by RS2 to be included in the set $\overline{q}_0$ for beam failure detection. In some embodiments, the set $\overline{q}_0$ may be updated by a PDCCH, if the TCI state of a CORESET is updated. For example, the PDCCH may be the PDCCH P which updates the TCI state or a separate PDCCH.

Figure 7:
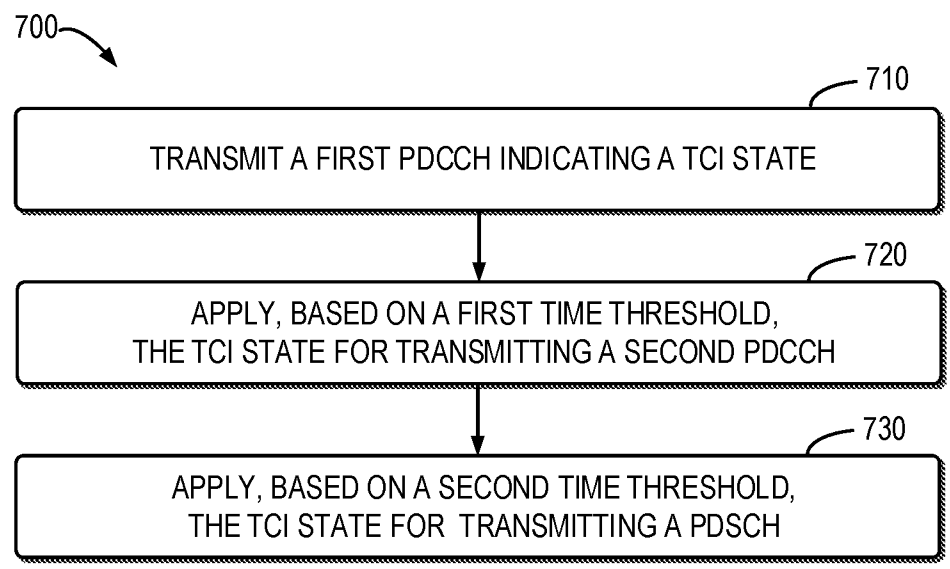
FIG. 7 illustrates a flowchart of an example method in accordance with some embodiments of the present disclosure.

FIG. 7 illustrates a flowchart of an example method 700 in accordance with some embodiments of the present disclosure. The method 700 can be performed at the network device 110 as shown in FIG. 1 and/or FIG. 2. It is to be understood that the method 700 may include additional blocks not shown and/or may omit some blocks as shown, and the scope of the present disclosure is not limited in this regard.

At block 710, the network device 110 transmits, to the terminal device 120, a first PDCCH indicating a TCI state (for example, TCI state B). The TCI state is configured to the terminal device 120 for monitoring a PDCCH in a CORESET and receiving a PDSCH scheduled by the monitored PDCCH.

In some embodiments, prior to transmitting the first PDCCH indicating the TCI state, the network device 110 may transmit, to the terminal device 120, a first configuration indicating a set of TCI states and transmit, to the terminal device 120, a second configuration indicating a further TCI state (for example, TCI state A) selected from the set of TCI states, where the first PDCCH updates the further TCI state to the TCI state.

In some embodiments, the TCI state may be selected from the set of TCI states.

In some embodiments, the network device 110 may transmit, to the terminal device 120, a third configuration for updating the set of TCI states. The TCI state may be selected from the updated set of TCI states.

In some embodiments, the first PDCCH may carry DCI comprising a TCI field indicating the TCI state.

In some embodiments, the first PDCCH may carry DCI comprising a new field indicating the TCI state and the new field may be different from the TCI field.

At block 720, the network device 110 applies, based on a first time threshold, the TCI state for transmitting a second PDCCH in the CORESET to the terminal device 120.

At block 730, the network device 110 applies, based on a second time threshold, the TCI state for transmitting a PDSCH to the terminal device 120.

In some embodiments, the first time threshold may be the same as the second time threshold.

In some embodiments, the first time threshold may be different from the second time threshold.

In some embodiments, after the first time threshold from a last symbol of the first PDCCH or a symbol of a PDSCH scheduled by the first PDCCH, the network device 110 may apply the TCI state for transmitting the second PDCCH to the terminal device 120.

In some embodiments, after the first time threshold from a slot in which the first PDCCH or a PDSCH scheduled by the first PDCCH is transmitted, the network device 110 may apply the TCI state for transmitting the second PDCCH to the terminal device 120.

In some embodiments, the network device 110 may receive, from the terminal device 120, a PUCCH comprising HARQ-ACK information corresponding to the first PDCCH or corresponding to a PDSCH scheduled by the first PDCCH. The network device 110 may apply, in a next slot after the first time threshold from a last symbol of the PUCCH, the TCI state for transmitting the second PDCCH to the terminal device 120.

In some embodiments, the network device 110 may receive, in a slot and from the terminal device 120, a PUCCH comprising HARQ-ACK information corresponding to the first PDCCH or corresponding to a PDSCH scheduled by the first PDCCH. The network device 110 may apply, in a next slot after the first time threshold from the slot, the TCI state for transmitting the second PDCCH to the terminal device 120.

In some embodiments, the network device 110 may update, based on the TCI state, a set of reference signal resources used for beam failure detection.

Figure 8:
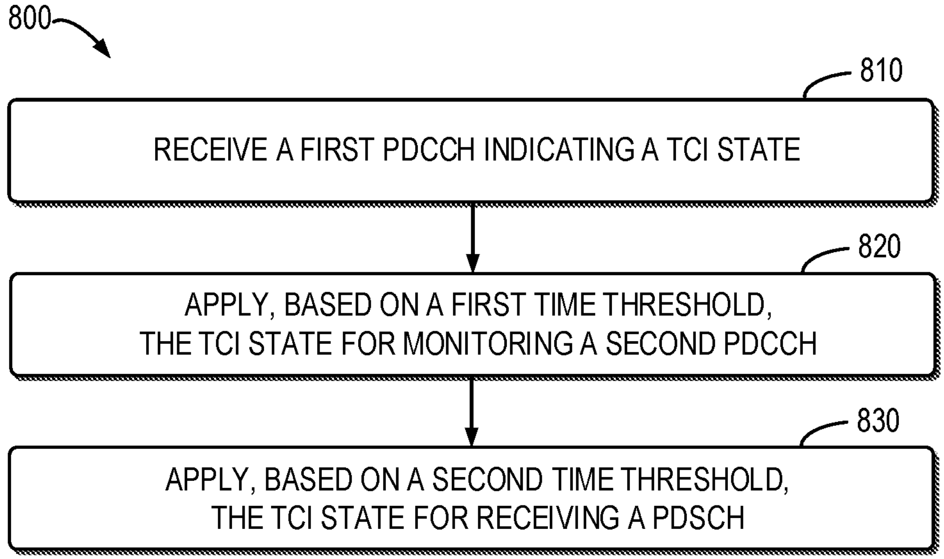
FIG. 8 illustrates a flowchart of an example method in accordance with some embodiments of the present disclosure.

FIG. 8 illustrates a flowchart of an example method 800 in accordance with some embodiments of the present disclosure. The method 800 can be performed at the terminal device 120 as shown in FIG. 1 and/or FIG. 2. It is to be understood that the method 800 may include additional blocks not shown and/or may omit some blocks as shown, and the scope of the present disclosure is not limited in this regard.

At block 810, the terminal device 120 receives, from the network device 110, a first PDCCH indicating a TCI state (for example, TCI state B). The TCI state is configured to the terminal device 120 for monitoring a PDCCH in a CORESET and receiving a PDSCH scheduled by the monitored PDCCH.

In some embodiments, prior to receiving the first PDCCH indicating the TCI state the terminal device 120 may receive, from the network device 110, a first configuration indicating a set of TCI states and receive, from the network device 110, a second configuration indicating a further TCI state (for example, TCI state A) selected from the set of TCI states, where the first PDCCH updates the further TCI state to the TCI state.

In some embodiments, the TCI state may be selected from the set of TC states.

In some embodiments, the terminal device 120 may receive, from the network device 110, a third configuration for updating the set of TCI states. The TCI state may be selected from the updated set of TCI states.

In some embodiments, the first PDCCH may carry DCI comprising a TCI field indicating the TCI state.

In some embodiments, the first PDCCH may carry DCI comprising a new field indicating the TCI state and the new field is different from the TCI field.

At block 820, the terminal device 120 applies, based on a first time threshold, the TCI state for monitoring a second PDCCH transmitted from the network device 110 in the CORESET.

At block 830, the terminal device 120 applies, based on a second time threshold, the TCI state for receiving a PDSCH transmitted from the network device 110.

In some embodiments, after the first time threshold from a last symbol of the first PDCCH or a symbol of a PDSCH scheduled by the first PDCCH, the terminal device 120 may apply the TCI state for monitoring the second PDCCH.

In some embodiments, after the first time threshold from a slot in which the first PDCCH or a PDSCH scheduled by the first PDCCH is received, the terminal device 120 may apply the TCI state for monitoring the second PDCCH.

In some embodiments, the terminal device 120 may transmit, to the network device 110, a PUCCH comprising HARQ-ACK information corresponding to the first PDCCH or corresponding to a PDSCH scheduled by the first PDCCH. The terminal device 120 may apply, in a next slot after the first time threshold from a last symbol of the PUCCH, the TCI state for monitoring the second PDCCH.

In some embodiments, the terminal device 120 may transmit, in a slot and to the network device, a PUCCH comprising HARQ-ACK information corresponding to the first PDCCH or corresponding to a PDSCH scheduled by the first PDCCH. The terminal device 120 may apply, in a next slot after the first time threshold from the slot, the TCI state for monitoring the second PDCCH.

In some embodiments, the terminal device 120 may update, based on the TCI state, a set of reference signal resources used for beam failure detection.

In view of the above, it can be seen that embodiments of the present disclosure provide a solution for beam management. According to this solution, a first PDCCH indicating a TCI state is transmitted from a network device to a terminal device. The TCI state is configured to the terminal device for monitoring a PDCCH in a CORESET and receiving a PDSCH scheduled by the monitored PDCCH. The terminal device applies, based on a first time threshold, the TCI state for monitoring a second PDCCH transmitted from the network device in the CORESET. The terminal device applies, based on a second time threshold, the TCI state for receiving a PDSCH transmitted from the network device. As such, a common beam used for PDCCH and PDSCH, which is indicated by a common TCI state, can be updated and the updated beam can be applied for PDCCH and PDSCH transmission/reception.

Figure 9:
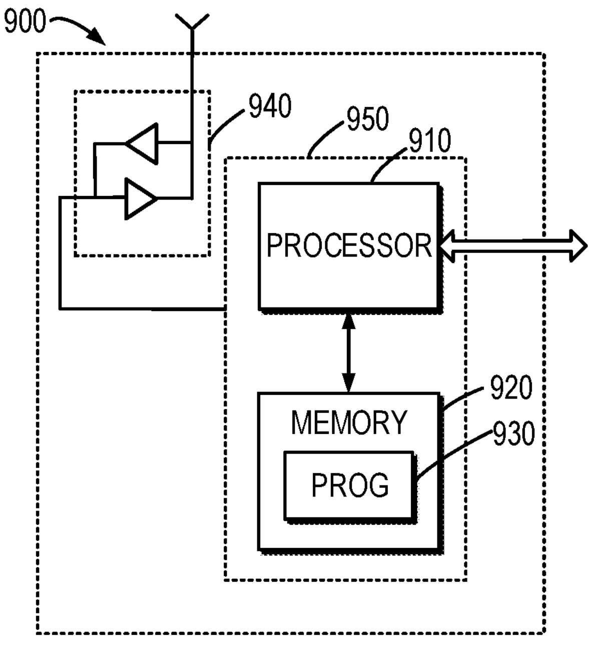
FIG. 9 is a simplified block diagram of a device that is suitable for implementing embodiments of the present disclosure.

FIG. 9 is a simplified block diagram of a device 900 that is suitable for implementing embodiments of the present disclosure. The device 900 can be considered as a further example implementation of the network device 110 or the terminal device 120 as shown in FIG. 1 and/or FIG. 2. Accordingly, the device 900 can be implemented at or as at least a part of the network device 110 or the terminal device 120 as shown in FIG. 1 and/or FIG. 2.

As shown, the device 900 includes a processor 910, a memory 920 coupled to the processor 910, a suitable transmitter (TX) and receiver (RX) 940 coupled to the processor 910, and a communication interface coupled to the TX/RX 940. The memory 910 stores at least a part of a program 930. The TX/RX 940 is for bidirectional communications. The TX/RX 940 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 930 is assumed to include program instructions that, when executed by the associated processor 910, enable the device 900 to operate in accordance with the embodiments of the present disclosure, as discussed herein with reference to FIG. 1 to 8. The embodiments herein may be implemented by computer software executable by the processor 910 of the device 900, or by hardware, or by a combination of software and hardware. The processor 910 may be configured to implement various embodiments of the present disclosure. Furthermore, a combination of the processor 910 and memory 920 may form processing means 950 adapted to implement various embodiments of the present disclosure.

The memory 920 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 920 is shown in the device 900, there may be several physically distinct memory modules in the device 900. The processor 910 may be of any type suitable to the local technical network, and may include one or more of general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 6 and/or FIG. 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, comprising:

receiving, from a network device, a downlink control information (DCI) comprising a transmission configuration indication (TCI) state indication;

transmitting, to the network device, a physical uplink control channel (PUCCH) carrying hybrid automatic repeat request acknowledgement (HARQ-ACK) information corresponding to the DCI or corresponding to a first physical downlink shared channel (PDSCH) scheduled by the DCI; and applying the TCI state starting from a first slot after N symbols from a last symbol of the PUCCH for physical downlink control channel (PDCCH) reception and for a second PDSCH reception, wherein N is an integer.

2. The method of claim 1, further comprising:

receiving, from the network device, a first configuration indicating a set of TCI states, wherein the set of TCI states comprises the TCI state.

3. A method performed by a network device, comprising:

transmitting, to a terminal device, a downlink control information (DCI) comprising a transmission configuration indication (TCI) state indication; and receiving, from the terminal device, a physical uplink control channel (PUCCH) carrying hybrid automatic repeat request acknowledgement (HARQ-ACK) information corresponding to the DCI or corresponding to a first physical downlink shared channel (PDSCH) scheduled by the DCI; and transmitting, to the terminal device, a physical downlink control channel (PDCCH) and a second PDSCH, wherein the TCI state is applied by the terminal device starting from a first slot after N symbols from a last symbol of the PUCCH for the PDCCH reception and for the second PDSCH reception, wherein N is an integer.

4. The method of claim 3, further comprising:

transmitting, to the terminal device, a first configuration indicating a set of TCI states, wherein the set of TCI states comprises the TCI state.

5. A terminal device, comprising:

a processor configured to cause the terminal device to:

receive, from a network device, a downlink control information (DCI) comprising a transmission configuration indication (TCI) state indication;

transmit, to the network device, a physical uplink control channel (PUCCH) carrying hybrid automatic repeat request acknowledgement (HARQ-ACK) information corresponding to the DCI or corresponding to a first physical downlink shared channel (PDSCH) scheduled by the DCI; and apply the TCI state starting from a first slot after N symbols from a last symbol of the PUCCH for physical downlink control channel (PDCCH) reception and for a second PDSCH reception, wherein N is an integer.

6. The terminal device of claim 5, wherein the terminal device is further caused to:

receive, from the network device, a first configuration indicating a set of TCI states, wherein the set of TCI states comprises the TCI state.

7. A network device, comprising:

a processor configured to cause the network device to:

transmit, to a terminal device, a downlink control information (DCI) comprising a transmission configuration indication (TCI) state indication; and receive, from the terminal device, a physical uplink control channel (PUCCH) carrying hybrid automatic repeat request acknowledgement (HARQ-ACK) information corresponding to the DCI or corresponding to a first physical downlink shared channel (PDSCH) scheduled by the DCI; and transmit, to the terminal device, a physical downlink control channel (PDCCH) and a second PDSCH, wherein the TCI state is applied by the terminal device starting from a first slot after N symbols from a last symbol of the PUCCH for the PDCCH reception and for the second PDSCH reception, wherein N is an integer.

8. The network device of claim 7, wherein the network device is further caused to:

transmit, to the terminal device, a first configuration indicating a set of TCI states, wherein the set of TCI states comprises the TCI state.

* * * * *